United States Patent [19]

Murrill

[11] Patent Number: 5,108,248

[45] Date of Patent: Apr. 28, 1992

[54] APPARATUS FOR LOADING BOAT TRAILERS ON TRUCK BEDS

[76] Inventor: Robert E. Murrill, 731 Old Corvallis Rd., Corvallis, Mont. 59828

[21] Appl. No.: 639,119

[22] Filed: Jan. 9, 1991

[51] Int. Cl.$^5$ ............................ B60R 9/00; B60R 9/08
[52] U.S. Cl. .................................... 414/462; 414/538
[58] Field of Search ............... 414/462, 538; 224/309, 224/310, 42.08

[56] References Cited

U.S. PATENT DOCUMENTS

| | | | |
|---|---|---|---|
| 3,596,788 | 8/1971 | Willie | 414/462 |
| 3,648,866 | 3/1972 | Slown | 414/462 |
| 3,679,080 | 7/1972 | Fulcher | 414/462 |
| 3,732,998 | 5/1973 | Martin | 414/462 |
| 3,734,321 | 5/1973 | Long et al. | 414/462 |
| 3,840,133 | 10/1974 | Berg | 414/462 |
| 3,843,002 | 10/1974 | Pihlgren | 414/462 |
| 3,872,989 | 3/1975 | Smithson et al. | 414/462 |
| 3,877,594 | 4/1975 | Coakley | 414/462 |
| 3,972,433 | 8/1976 | Reed | 414/462 |

Primary Examiner—Robert J. Spar
Assistant Examiner—Brian K. Dinicola

[57] ABSTRACT

An apparatus for loading a boat and corresponding boat trailer to which the boat is attached onto the bed of a standard pickup truck. The invention comprises a pair of ramps, each having one end placed on the rear edge of the truck bed and the other end being placed on the ground; a loading frame securely attached to the bed; a winch firmly secured to the loading frame and having a winch cable attached at one end thereto, the winch cable being attached to the trailer; a guide channel for directioning and providing support for the winch cable and tongue of the trailer as it is pulled forwardly and upwardly by the winch; and a plurality of lighting arms for engaging and lifting the axle of the trailer to maintain the boat and trailer in a substantially horizontal position as the winch pulls the trailer along the guide channel.

12 Claims, 6 Drawing Sheets

APPARATUS FOR LOADING BOAT TRAILERS ON TRUCK BEDS

BACKGROUND

1. Field

This invention relates generally to the transportation of boats mounted on trailers, and more specifically to a an apparatus and related method for mounting a boat and trailer onto the bed of a standard pickup truck.

2. Prior Art

Boats used for recreational purposes are usually transported overland by mounting the boat onto a trailer and then connecting the trailer to the back of a truck or other suitable vehicle by use of a standard ball and hitch arrangement. While this procedure is adequate when only one trailer is to be pulled, a different method of transportation must be used when two trailers are to be transported simultaneously.

To provide for this situation, a number of prior art devices have been created which have the capability of lifting a boat and the trailer upon which that boat is mounted off of the ground and placing it onto the bed of a standard pickup truck. For example, applicant is aware of the following U.S. Patents, which, it is submitted, are relevant only as references, and not as prohibitive prior art:

| | |
|---|---|
| U.S. Pat. No. 3,648,866 | U.S. Pat. No. 3,843,002 |
| U.S. Pat. No. 3,734,321 | U.S. Pat. No. 4,274,788 |
| U.S. Pat. No. 3,732,998 | U.S. Pat. No. 3,840,133 |

The most relevant of these patents, U.S. Pat. No. 3,843,002, issued to Pihlgren, discloses an apparatus having pivot support rods pivotally mounted at one end to a support plate at the rear of the truck. The free ends of these rods engage the axle of the trailer as the trailer is pulled up over ramps onto the bed of the truck, then pivot forwardly to raise the trailer into a basically level position. This patent, while providing effective lifting means to hoist the boat and trailer, does not disclose an effective method for guiding the tongue of the trailer as it is hoisted. As a result, a danger exists of the tongue straying to one side or the other, in the worst case the entire trailer and boat being derailed and/or flipped over. This can be of particular concern when attempting to load a boat and trailer assembly onto the bed of a truck when on a slant or in high winds.

While some of the other patents listed, namely the U.S. Pat. No. 3,648,866 patent to Slown and the U.S. Pat. No. 3,734,321 patent to Long et al., disclose methods for guiding the tongue, each of these methods has distinct disadvantages. For example, the guide rail structure of the Long patent is extremely long and unwieldy, the forward portion thereof extending well beyond the cab of the truck and the rear portion thereof extending past the rear end of the truck. The Slown patent, on the other hand, discloses a shorter guide rail, this guide rail, however, having the disadvantage of being rigidly fixed into place, thus substantially inhibiting the possibility of storing a significant amount of cargo in the bed of the truck after the boat and trailer have been mounted. This may be unacceptable if a lengthy trip is being planned and extra space is at a premium.

Hence, there is a legitimate need for a boat and trailer mounting assembly which is less bulky and more adaptable to the practical demands of the situation.

BRIEF SUMMARY AND OBJECTS OF THE INVENTION

A principal object of the present invention is the provision an improved apparatus and related method for loading a boat and the trailer upon which the boat is mounted onto the bed of a pickup truck for transportation having the advantage of requiring less space than prior art devices.

Another major object of this invention is to provide an improved apparatus and method for loading a boat and related trailer onto the bed of the pickup truck, the apparatus being easily installed and easily removed and stored when not in use.

A further significant object is to provide a stable method of guiding the tongue of a boat trailer in the proper direction when hoisting the trailer and boat onto the bed of a pickup truck for transportation purposes.

Still another primary object is the provision of an apparatus for loading a boat and trailer which is stable, inexpensive to manufacture, efficient, nondamaging to the boat and trailer and safe to use in virtually all contemplated circumstances.

Accordingly, the present invention comprises at least one loading ramp which is placed with one end on the rear edge of the truck bed and the other end on the ground, a loading frame to which a winch is attached, a cable integrally connected at one end to the winch, a trailer tongue guide channel, and an axle lift arm unit for engaging and lifting the axle of the trailer. The guide channel is pivotally mounted at one end to the loader frame, the other end being slightly cantilevered over the rear edge of the truck. The cable is partially contained within the guide channel, one end being attached to the winch and the other end, after passing through the guide channel being coupled to the boat trailer. The axle lift arm unit has a plurality of lift arms pivotally connected at one end thereof to the loading frame, the free ends having means to receive the axle of the trailer.

In use, one end of the cable is connected to the tongue of the trailer, which has been placed directly behind the pickup truck and is facing the same direction. After placing the loading ramps in the proper position, the winch is activated to begin to pull the boat and trailer forwardly and upwardly. The end of the trailer tongue is engaged by the guide channel as the front end of the trailer is raised, the wheels of the trailer being pulled up the loading ramps.

Upon reaching the bed of the truck, the axle of the trailer is engaged by the two lift arms. As forward motion continues, the lift arms pivot about the connected ends to lift the rear portion of the boat and trailer. By the time the winch has pulled the trailer tongue from one end of the guide channel to the other, the lift arms have rotated into a substantially vertical position to maintain the boat and trailer in a horizontal position. In this position, the trailer extends forwardly over the cab with the trailer tongue resting on an alignment plate, or alternatively another channel, attached to the loader frame.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Reference is now made to the drawings wherein like numerals are used to designate like components throughout. The apparatus of the present invention comprises generally a loading frame 10, a cable 11, a guide channel 12, a winch 14, lift arms 16, and a set of ramps 18, all of which are hereinafter described in greater detail.

Frame 10 is removably mounted to the bed of a standard pickup truck 13 by mounting plates 20, 22, and 24. Mounting plate 20 is a long rectangular strip of steel or other structural material and is securely attached to the bed of the truck at the front thereof, the longitudinal axis of plate 20 bisecting the longitudinal axis of the truck 13. It will be recognized that mounting plate 20 may be either permanently attached (as by welding) or temporarily attached (as by threaded bolts) to the bed of the truck 13. Situated at either end of mounting plate 20 are receiving ports 26a and 26b.

Figure 1:
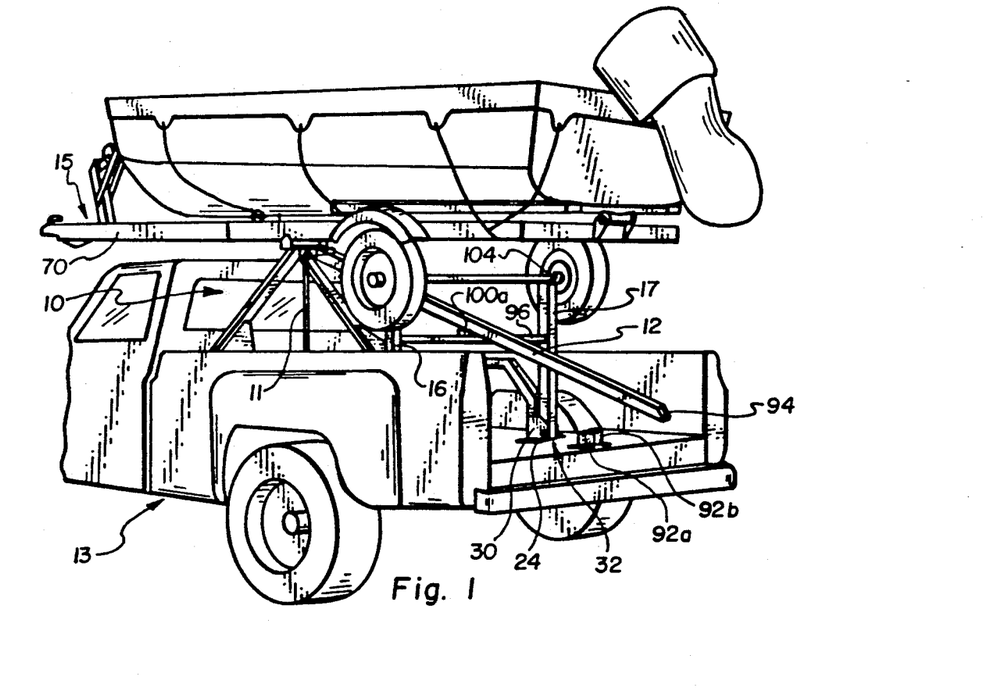
FIG. 1 is a rear perspective view, according to the present invention, of a preferred apparatus for loading boats and boat trailers onto truck beds, shown mounted on a pickup truck in the loaded, ready for transport, position.

Mounting plates 22 and 24 are rigidly attached in the same manner as plate 20 to the bed of the pickup truck 13 near the rear wheel wells, as best shown in FIG. 1. Each plate 22 and 24 has an approximately square shape and has frame receiving ports 28 and 30, respectively, similar in all respects to receiving ports 26a and 26b situated on mounting plate 20. Each receiving port 26a, 26b, 28, and 30 receives a square cross-sectioned vertical frame member, hereinafter described.

Also provided at each port 26a, 26b, 28 and 30 is a locking pin arrangement 32 for temporarily securing said vertical member into each port. Each locking pin arrangement 32 comprises a pin 34, which, in the "as used" position, passes through aligned apertures in the receiving port and corresponding vertical frame member, an outwardly biased nipple preventing the pin 34 from inadvertently disengaging from the apertures. A release button 36 disengages the nipple to allow insertion or retraction of the pin during assembly or disassembly. In the alternative, lock pin 34 may be inwardly biased by a spring or by other suitable means Loading frame 10 has a preferred general configuration, shown best in FIG. 3, of hollow structural steel tubing with a square cross-section. It should be recognized that different configurations of tubing as well as various other cross-sections are contemplated and are within the purview of this invention. The configuration of FIG. 3 shows vertical end elements 38a and 38b, 40 and 42, which are received by ports 26a and 26b, 28 and 30, respectively, and temporarily secured by locking pin arrangement 32 as previously described.

Figure 3:
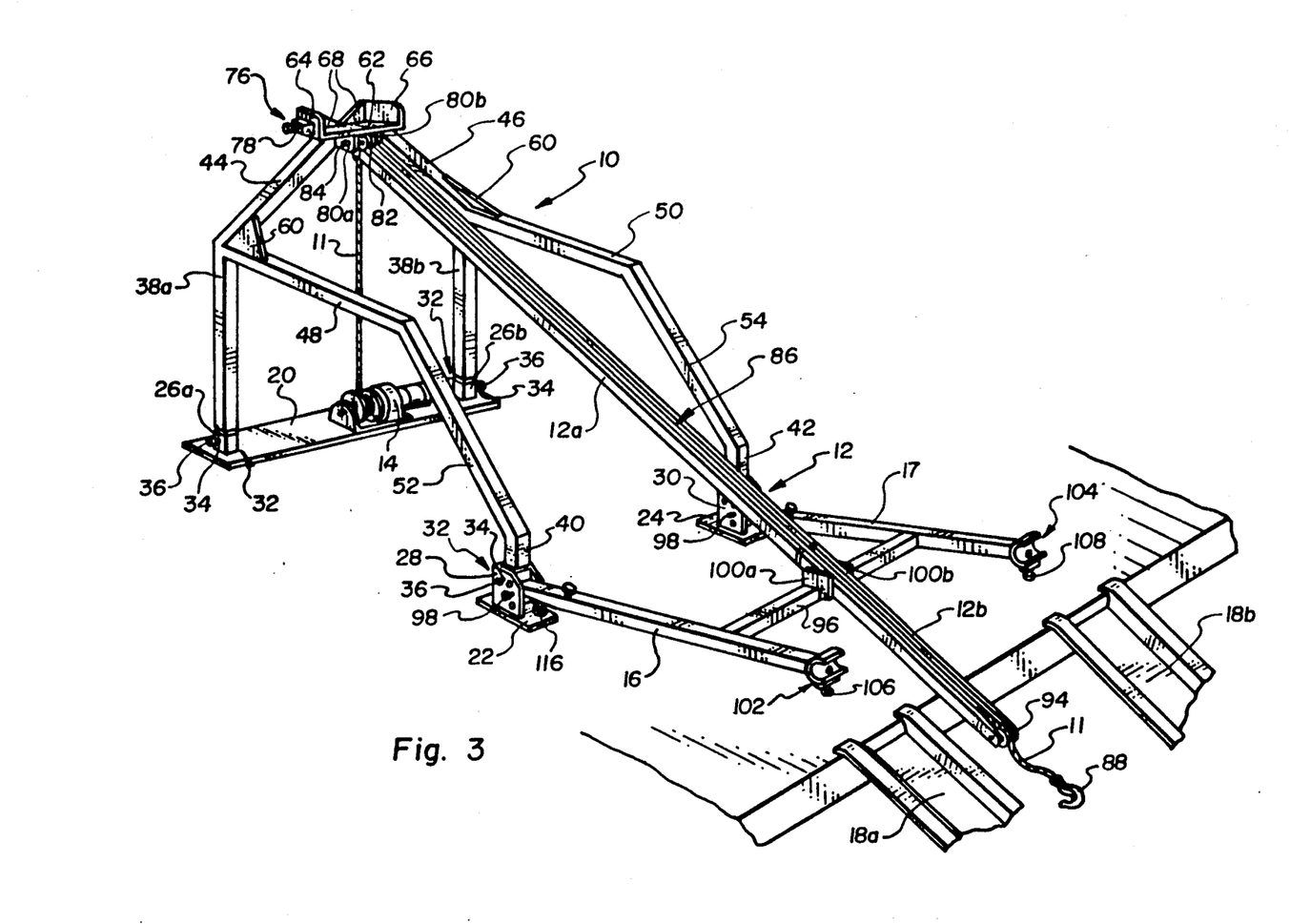
FIG. 3 is a perspective, partial cutaway view of the invention of FIG. 1 shown isolated from the truck onto which it is mounted during use and providing details of the guide channel and loading frame.

Diagonal elements 44 and 46 extend upwardly and inwardly from vertical end elements 38a and 38b, respectively, to meet to form a crest, both ends of each element being integrally connected, as shown in FIG. 3. Horizontal elements 48 and 50 each extend rearwardly from a first end which is integrally attached to vertical end frame elements 38a and 38b and diagonal elements 44 and 46, respectively. Other diagonal elements 52 and 54 extend rearwardly and downwardly from integral attachment to horizontal elements 48 and 50, respectively, diagonal elements 52 and 54 being integrally attached respectively to one end of short vertical end frame elements 56 and 58. The second end of each short vertical frame element, 56 and 58 is received into ports 28 and 30. Frame 10 may be reinforced in any number of ways known and accepted in the industry, including but not limited to joint plates 60, best shown in FIG. 3.

Figure 2:
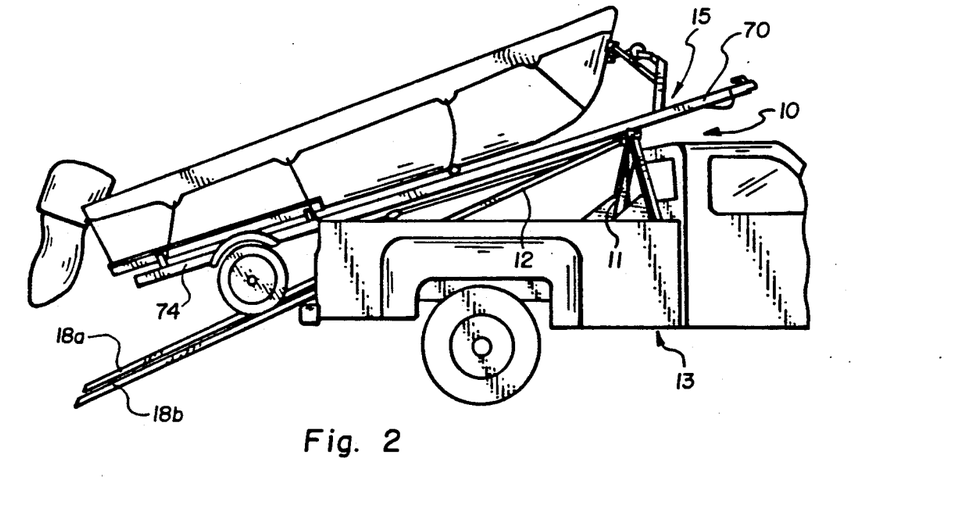
FIG. 2 is a perspective view of the invention of FIG. 1 shown partway through the loading procedure.
Figure 4:
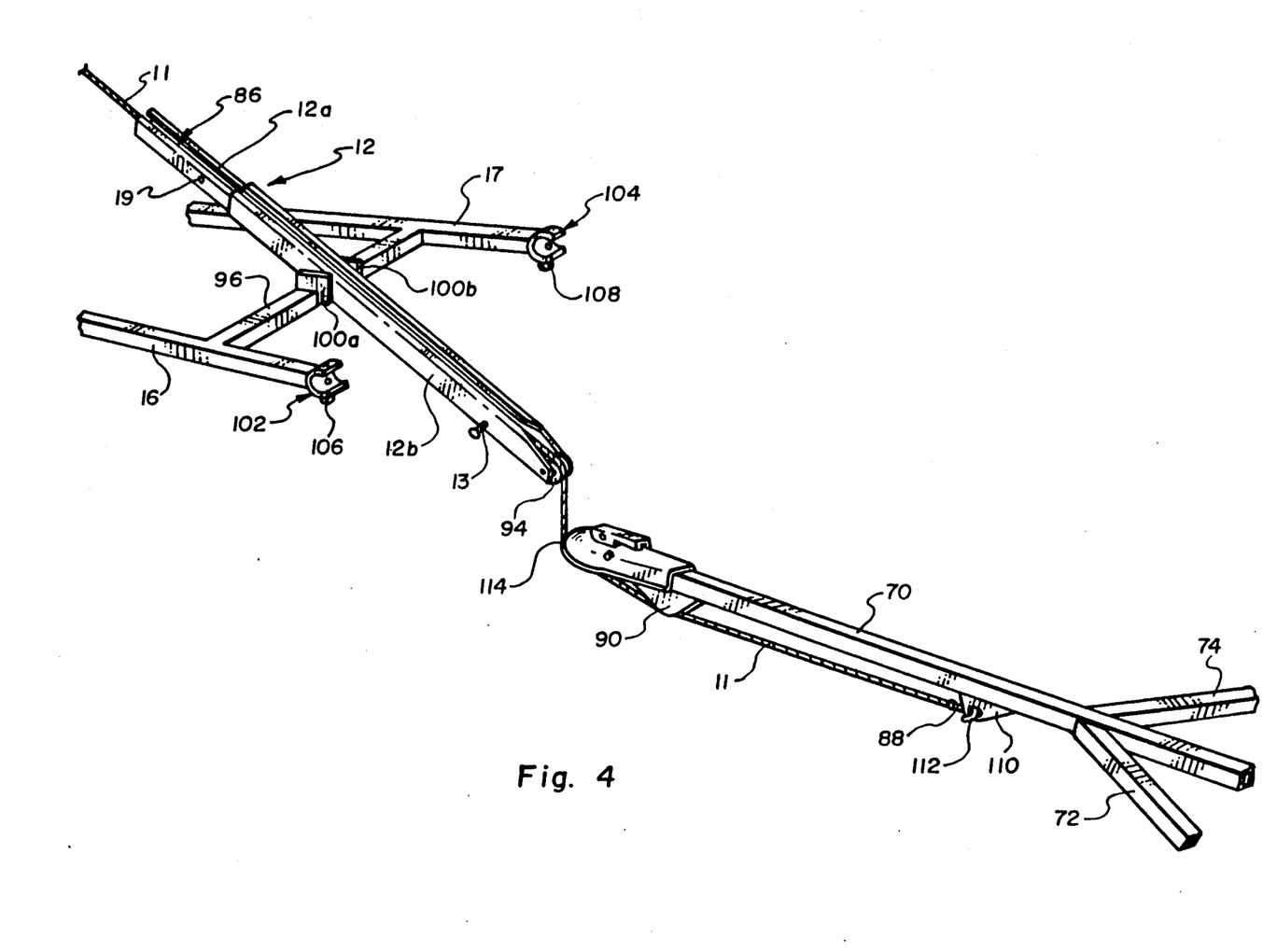
FIG. 4 is a cutaway perspective view of the lift arms, guide channel and attachment of the cable to the boat trailer.

At the crest of frame 10, formed by the integral connection of diagonal elements 44 and 46, is a top plate 62, again best shown in FIG. 3. Top plate 62 is rigidly attached, as by welding, to diagonal elements 44 and 46 and has a top side and a bottom side. The top side thereof comprises two side walls 64 and 66 and a front wall 68. Front wall 68 has an overall V-shape, seen in FIG. 3, shaped so as to comfortably receive the tongue 70 of the boat trailer 15 to be mounted, as shown in FIGS. 1 and 2. Side walls 64 and 66 taper inwardly towards the front of the truck to prevent forward movement of the trailer 15 past the joint where radial structure elements 72 and 74 of the trailer 15, see FIG. 4, are integrally connected to the trailer tongue 70.

Thus, in the "as transported" position, top plate 62, side walls 64 and 66, and front wall 68 provide structural support for the front portion of the boat and trailer assembly. To secure the front portion of the trailer 15 in place on top plate 62 in preparation for transport, a safety lock 76 is provided. Safety lock 76 comprises an inwardly biased pin 78 mounted to side wall 64, pin 78 extending through an aperture, not shown, to engage a corresponding aperture in the trailer, thereby preventing movement of the trailer and boat when properly mounted.

The bottom side of top plate 62 comprises two parallel vertically disposed brackets 80a and 80b for pivotally mounting both a pulley 82 and one end of the guide channel 12. Each is connected to brackets 80a and 80b by a pin 84 having sufficient diameter and structural integrity to bear the entire weight of the boat as it is pulled upwardly and forwardly along the guide channel 12. Pulley 82 and guide channel 12 are situated so as to receive a cable 11, which is wrapped around the pulley 82 and then passes through the guide channel 12.

The winch 14 is rigidly attached near the center of mounting plate 20, as seen in FIG. 3, one end of the cable 11 being attached to an integrated spool powered by the winch 14. The preferred winch 1 has the capability of extending and retracting at least two thousand pounds attached to cable 11, is electrically powered, and operated by remote control. Thus, cable 11 is attached at one end to winch 14, extends upwardly to wrap around pulley 82 and is then encased with guide channel 12 throughout the length thereof. The free end of cable 11 is equipped with a hook 88, for attaching onto the frame of the trailer 15. See FIGS. 3 and 4.

Guide channel 12 preferably has a hollow square cross-section except for a continuous slot 86 formed in the top surface thereof, which extends the entire length of guide channel 12. The slot 86 receives an engaging fin 90, shown in FIG. 4, which has been formed on the bottom side of the boat trailer 15. The free end of guide channel 12 may be extended and retracted in telescoping fashion, thus allowing earlier engagement of fin 90 into the slot 86 of guide channel 12, as best shown in FIG. 4.

To accommodate the telescoping action, guide channel 12 is preferably divided into two interacting portions 12a and 12b. Portion 12b has a slightly larger cross-sectional area than portion 12a such that the nonattached end of portion 12a is slidably and snugly, but not tightly, received into portion 12b. Stops (not shown) are disposed at the end of portion 12a to prevent portion 12b from detaching therefrom. Also, a locking pin 13 on portion 12b prevents sliding of the two portions, for example during travel, when passed through an aligned aperture 19 in portion 12.

As shown in FIG. 3, portion 12b of guide channel 12 rests on the rear transverse edge of the pickup truck 13 onto which the boat and trailer 15 are being loaded, the free end thereof being cantilevered over the edge. Optionally, two vertically disposed guide plates 92a and 92b, rigidly connected to the transverse edge of the truck 13, provide a guide into which portion 12b of guide channel 12 may be received to prevent undesired lateral movement and stress on guide channel 12 during the loading procedure. The free end of portion 12b of guide channel 12 also has a small pulley 94 to prevent undue stress on cable 11 caused by an edge of guide channel 12.

Lift arms 16 and 17 are both pivotally attached at one end to receiving ports 28 and 30, respectively, as shown in FIG. 3. A cross arm 96 integrally connects arms 16 and 17 such that all movement thereof is done as a unit. As shown, pins 98 attach arms 16 and 17 to receiving ports 28 and 30, respectively, and allow pivotal movement about a common axis of approximately ninety degrees varying between the horizontal (unloaded) and the vertical (loaded) positions.

Two small vertical plates 100a and 100b are attached approximately midway between lift arms 16 and 17 on cross arm 96 to receive guide channel 12 when the lift arms are pivotally moved. Thus, as lift arms 16 and 17 are raised from the horizontal to the vertical position, guide channel 12 is engaged by vertical plates 100a and 100b and raised from off of the bed of the pickup truck 13, thereby providing more space for the storage of items.

Figure 9:
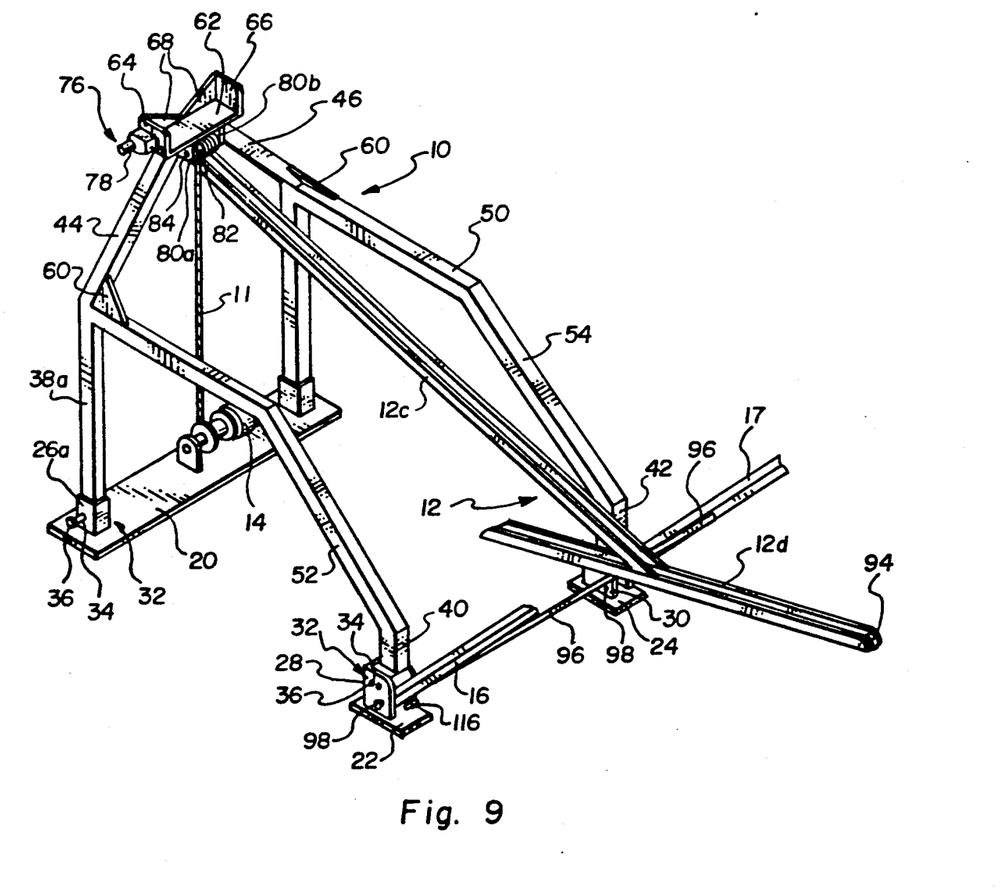
FIG. 9 is a perspective, partial cutaway view of the invention similar to FIG. 3 and illustrating another preferred guide channel.

Another preferred embodiment of guide channel 12 is shown in FIG. 9. In this embodiment, guide channel 12 is separated into two interacting portions 12c and 12d. As shown, portion 12c is rotatably attached at one end to the crest of frame 10, similar in all respects to the embodiment of FIG. 3. The opposite end is slidably connected to portion 12d, which is rigidly mounted on cross arm 96 disposed between lift arms 16 and 17. Rollers or small wheels (not shown) attached to the opposite end of portion 12c and contacting the bottom surface of portion 12d allow for a free sliding relationship between the two portions.

Portion 12d is situated on cross-arm 96 so that when lift arms 16 and 17 are in the horizontal position, portion 12d extends downward from the edge of the truck 15 to a height approximately equal to that of the trailer tongue 70. In this position, portions 12c and 12d are linearly aligned, with portion 12c lying inside of portion 12d. As lift arms 16 and 17 are raised to a vertical position, portion 12c slides along through portion 12d, as seen, thereby raising portion 12c up and away from the bed of the truck 15.

Figure 5:
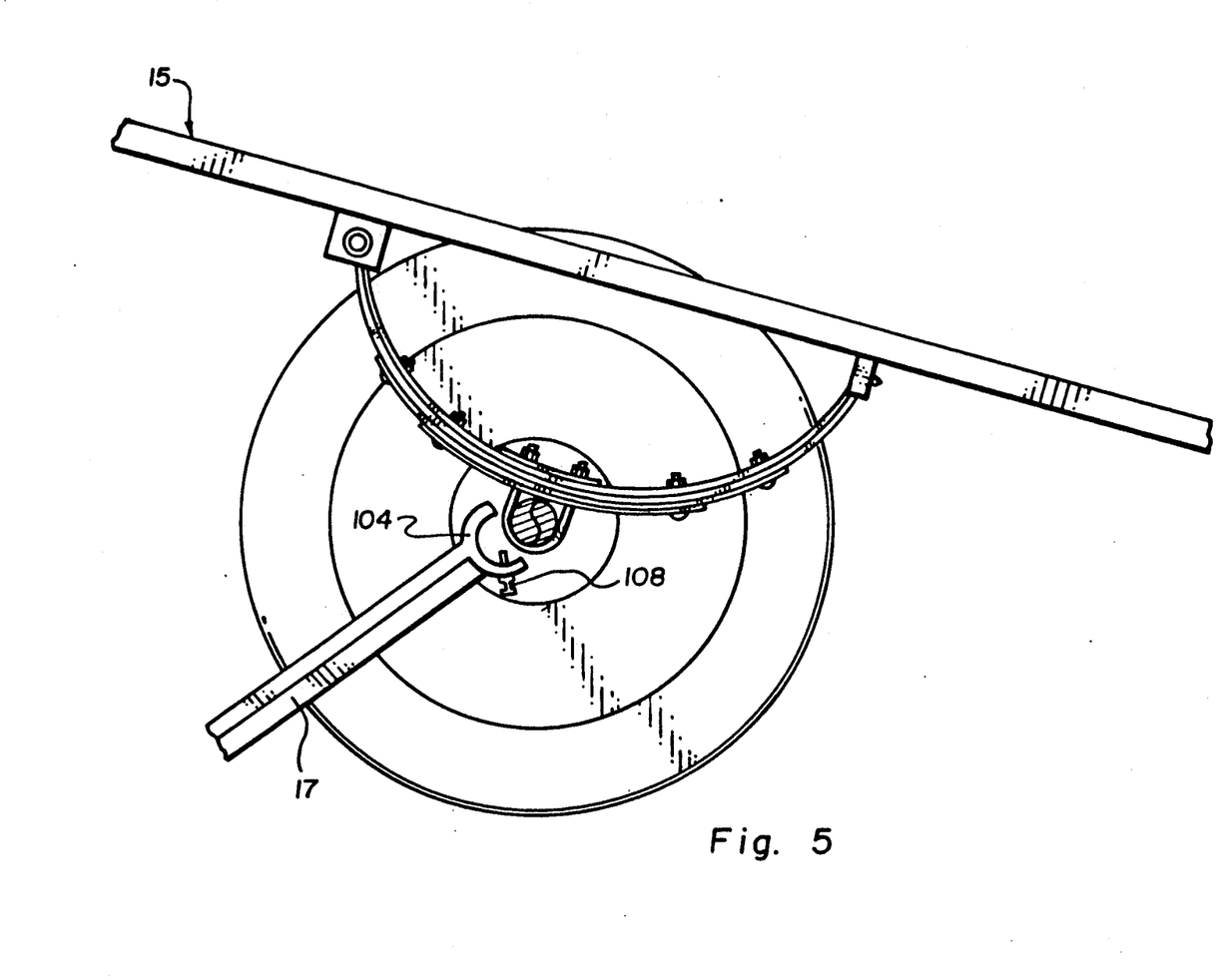
FIG. 5 is an isolated cutaway view of a lift arm of the invention of FIG. 1, about to receive a portion of the trailer's axle prior to hoisting the boat and trailer into the loaded, ready for transport, position.

The non-attached end of each lift arm 16 and 17 has a semicylindrical axle-receiving pocket 102 and 104, each pocket 102 and 104 being provided with a spring loaded pin 106 and 108, respectively. Spring loaded pins 106 and 108 are inwardly biased by a spring through an aperture in each pocket 102 and 104, such that each pin 106 and 108 extends substantially across the open portion of respective pockets 102 and 104. Hence, the axle of trailer 15 received into a pocket 102 or 104 will remain therein because of the spring loaded pin 106 or 108. It will be recognized, however, that before the trailer axle can be received into either pocket 102 or 104, spring loaded pins 106 and 108 must be retracted until the axle is received therein. Pins 106 and 108 are then released to lock the axle in position.

The two ramps 18a and 18b are identical, each providing a way for one of the wheels of trailer 15 to roll uninterrupted from the ground to the bed of pickup truck 13. Thus, it will be seen that each ramp 18a and 18b has one end which is placed on the rear transverse edge of the truck bed while the other end thereof rests on the ground. The leading ends of the ramps 18a and 18b may contain a hook or other apparatus for temporarily attaching the ramps to the rear edge of truck 13, thereby precluding or minimizing the possibility of a ramp 18a or 18b disengaging from the rear edge of truck 13 when trailer 15 is riding thereon.

The ramps 18a and 18b are of a sufficient length to form an approximate 30 degree angle with the ground upon which they rest. On the other hand, it is desirable that the ramps 18a and 18b be at least short enough to fit into the bed of truck 13 after use for transport with the boat and trailer 15. Each ramp 18a and 18b is made preferably of a lightweight structural material and may comprise ridges, ribs or other common structural components to add to its structural integrity while carrying as little weight as possible.

It should be recognized that minor modifications must be made to the boat trailer 15 before the present invention can be effectively used therewith. Specifically, an attachment plate 110 may be added, best seen in FIG. 4, the plate 110 having an eye 112 for receiving the hook 88 attached to one end of the cable 11. Plate 110 is preferably made of a structural steel and securely attached as by welding to the bottom face of the trailer tongue 70, as shown. Also, fin 90, referred to earlier, is a feature not generally found on boat trailers and thus must be added separately. Fin 90 is formed of a structural steel plate and has a curved indentation along the bottom edge thereof to receive the cable 11, the top edge of fin 90 being rigidly attached as by welding to the trailer 13. Further, a small indentation 114 is formed in the forwardmost edge of the trailer hitch, as shown in FIG. 4, this also providing a guide for the cable 11.

The cable 11 runs upwardly from the winch 14, one end being attached thereto, then wrapping around the pulley 82 and running inside guide channel 12 the entire length thereof before being engaged by the pulley 94 at the end of guide channel 12. The cable 11 is then wrapped around indentation 114 and fin 90 finally to be attached at its end by hook 88 to eye 112 of plate 110.

It will be realized that prior to attachment of the cable 11 to the trailer 15, the pickup truck 13 has been situated such that guide channel 12 is substantially aligned with the tongue 70 of the trailer 15, guide channel 12 and the tongue 70 almost, but not quite, touching. Ramps 18a and 18b are then placed so as to line-up with each corresponding wheel of the trailer 15.

Winch 14 is then activated to begin slow retraction of the cable 11, thus beginning to pull the boat and trailer 15 towards the truck 13. It will be noticed that soon after the retraction begins, fin 90 will pass over pulley 94 and become engaged in guide channel 12 thereby ensuring that the boat and trailer 13 are pulled along a substantially straight line. Retraction is continued as the front of the trailer is pulled along the length of guide channel 12, the wheels of the trailer eventually being engaged by and rolling up the ramps 18a and 18b.

When the wheels reach the rear edge of the bed of the truck 13, motion may be halted for a short time to allow engagement of lift arms 16 and 17 with the trailer axle, spring loaded pins 106 and 108 being manually retracted. Following engagement and locking of the axle onto lift arms 16 and 17, retraction is once again commenced, the lift arms rotating about their pivotal connection to raise the axle of the trailer 15 up off of the bed of the truck 13, the lift arms 16 and 17 eventually coming to a substantially vertical position. When lift arms 16 and 17 reach a nearly vertical position, fin 90 has already passed over top plate 62 and the triangular junction of structural element 72 and 74 with trailer tongue 70 contacts side walls 64 and 66 of top plate 62. At this point, safety lock 76 engages a corresponding aperture formed in trailer tongue 70 to prevent further forward, backward, or sideward movement of the trailer.

Figure 6:
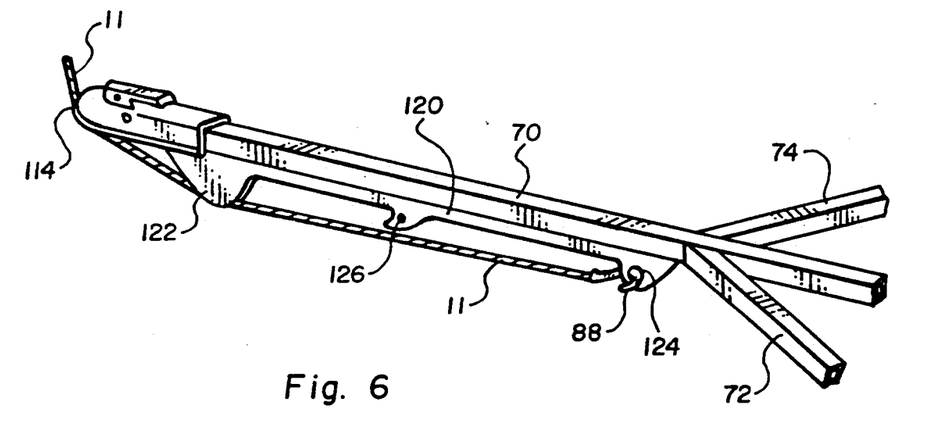
FIG. 6 is an isolated cutaway view of the tongue of the boat trailer illustrating a portion of a second preferred system for attaching the tongue to the loading frame.
Figure 7:
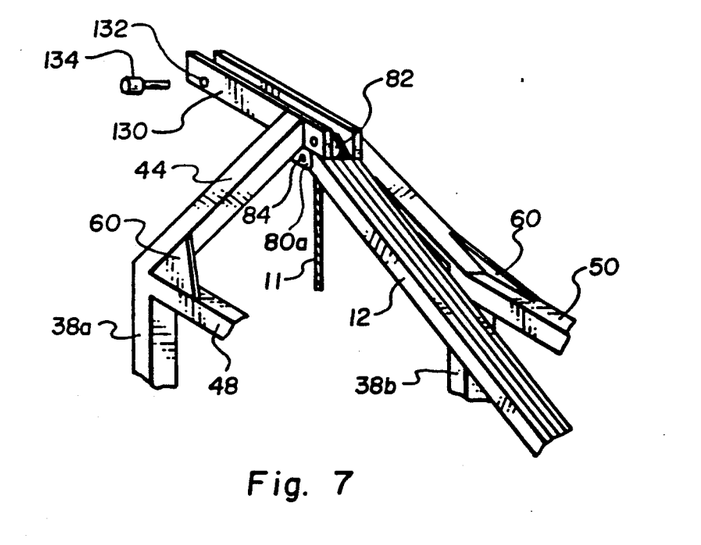
FIG. 7 is an isolated cutaway view of the rest of the loading frame illustrating the other portion of the second preferred system for attaching the tongue to the loading frame.
Figure 8:
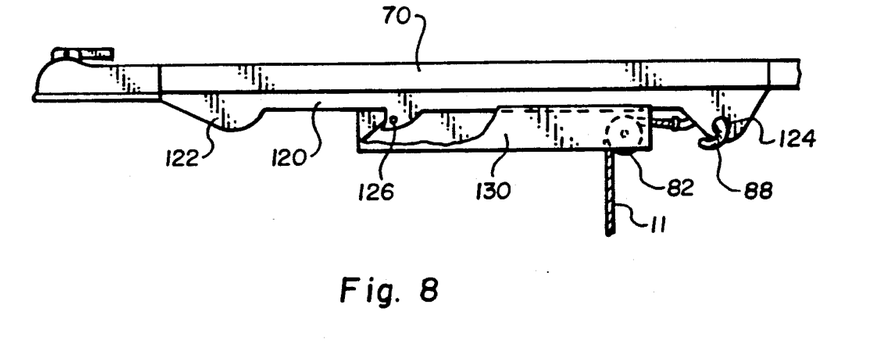
FIG. 8 is an isolated cutaway view of the second preferred system for attaching the tongue of the boat trailer to the loading frame, shown in the loaded, ready for transport position.

FIGS. 6 through 8 show a second preferred embodiment for attaching a trailer tongue 70 to the loading frame 10 in preparation for transportation. FIG. 6 shows a single plate 120, rigidly attached to the bottom face of trailer tongue 70, so as to extend vertically downward. Plate 120 comprises at one end a fin 122 similar to fin 190 over which cable 11 passes and a hook receiving eye 124 at the other end similar to eye 112. Plate 120 further comprises in the approximate mid point thereof, a second eye 126, the function of which is explained hereafter.

In connection with the second preferred embodiment, top plate 62 is replaced with a horizontal channel 130 as shown in FIG. 7, similar in many ways to channel 12. It will be seen that channel 130 is attached as by welding to the crest of loading frame 10. In practice, fin 122 engages channel 12 through slot 86 to draw the boat trailer forwardly and upwardly as in the first embodiment herein described. Upon reaching the end of channel 12, fin 122 slides over pulley 82 to become engaged in horizontal channel 130.

The boat trailer continues to move forward until fin 122 no longer engages the slot of channel 130 and hook 88 engaged in eye 124 is nearly in contact with pulley 82 as shown in FIG. 8. At this point, eye 126 is in alignment with an aperture 132 formed in channel 130, both aperture 126 and 132 receiving a pin 134 which when engaged prevents movement of the boat trailer tongue. Pin 134 may have a locking mechanism similar to pin 78 which prevents inadvertent loosening and/or disengagement thereof from apertures 126 and 132.

Unloading the boat and trailer are merely a reversal of the loading procedure above described, it being recognized that lift arms 16 and 17 never quite reach complete verticality. Rather, liftarms 16 and 17 maintain a slight rearward tip after loading to provide rearward momentum of the boat and trailer 15 when unloading. It will be further recognized that the entire apparatus of the invention can with a minimal of effort be removed from the bed of truck 13 to allow for use of the bed in other nonrelated capacities.

It is to be understood that the above described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. An apparatus for loading a boat trailer with an axle, wheels and tongue, to a position above the bed of a pickup truck and maintaining it in that position, said pickup truck having a cab, said apparatus comprising a loading frame rigidly mountable in the bed of the pickup truck for disposition at the front of the truck bed, the loading frame including a trailer tongue support attached thereto and disposed above the truck bed at the front thereof, and having cable extending and retracting means coupled thereto a cable having a first and a second end, the first end being integrally connected to the cable extending and retracting means and the second end having coupling means for temporarily attaching the cable to the boat trailer to pull the boat trailer forward toward the front of the truck bed when the cable is retracted;

guiding means for directing the cable along a predetermined alignment, said guiding means comprising a first and a second end and means for channeling the tongue of the trailer in a substantially straight path as the trailer is loaded, the first end of said guiding means being pivotally connected to the loading frame and not substantially extending over the cab of the pickup truck;

lifting means having first and second ends, the first end of said lifting means being pivotally connected to the loading frame and the second end of said lifting means having receiving means for engaging the axle of the boat trailer as it is pulled forward, said lifting means in combination with the guiding means and loading frame thereby providing for hoisting the trailer clear of and above the bed of the pickup truck with the trailer axle resting on the lifting means and the trailer tongue resting on the tongue support; and at least one ramp having a first and a second end, the first end of the ramp being disposable on the bed of the pickup truck and the second end being disposable on the ground so that as the trailer is pulled forward, the trailer wheels ride over the ramp.

2. An apparatus according to claim 1, wherein the cable extending and retracting means comprises a winch.

3. An apparatus according to claim 2, wherein the winch is driven by electric power means, said electrical power means being actuated by remote control.

4. An apparatus according to claim 1, wherein the coupling means is a hook.

5. An apparatus according to claim 1, wherein the means for channeling the tongue of the trailer comprises a guide channel having a continuous slot in which the cable is disposed.

6. An apparatus according to claim 5, wherein the guide channel comprises two interacting portions.

7. An apparatus according to claim 6, wherein the two interacting portions of the guide channel interact in telescoping fashion.

8. An apparatus according to claim 6, wherein the two interacting portions of the guide channel interact in a free sliding relationship.

9. An apparatus according to claim 5, wherein the tongue of the boat trailer has a fin for engaging the continuous slot.

10. An apparatus according to claim 1, wherein the lifting means comprises a plurality of lift arms with a crossbar disposed therebetween, the crossbar engaging the second end of the guiding means and lifting it as the lift arms hoist the trailer clear of and above the bed of the pickup truck.

11. An apparatus according to claim 10, wherein the receiving means comprises a semicylinder disposed at the end of each lift arm.

12. An apparatus according to claim 11, wherein the receiving means further comprises locking means for maintaining the axle of the boat trailer within the semicylinders.

* * * * *